US012362652B2

(12) United States Patent
Sugawara

(10) Patent No.: US 12,362,652 B2
(45) Date of Patent: Jul. 15, 2025

(54) INTEGRATED CIRCUIT AND POWER SUPPLY CIRCUIT

(71) Applicant: FUJI ELECTRIC CO., LTD., Kawasaki (JP)

(72) Inventor: Takato Sugawara, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 278 days.

(21) Appl. No.: 18/087,782

(22) Filed: Dec. 22, 2022

(65) Prior Publication Data

US 2023/0253871 A1    Aug. 10, 2023

(30) Foreign Application Priority Data

Feb. 9, 2022   (JP) ................................ 2022-019111

(51) Int. Cl.
| | |
|---|---|
| *H02M 3/335* | (2006.01) |
| *H02M 1/00* | (2007.01) |
| *H02M 1/088* | (2006.01) |
| *H02M 3/00* | (2006.01) |

(52) U.S. Cl.
CPC ............. *H02M 1/088* (2013.01); *H02M 3/01* (2021.05); *H02M 3/33569* (2013.01)

(58) Field of Classification Search
CPC ..... H02M 3/33569; H02M 1/088; H02M 3/01
See application file for complete search history.

(56) References Cited

U.S. PATENT DOCUMENTS

| | | | |
|---|---|---|---|
| 2013/0010502 A1* | 1/2013 | Chen ................... | H02M 3/3387 363/21.02 |
| 2017/0110974 A1 | 4/2017 | Chen | |
| 2017/0201183 A1* | 7/2017 | Chen ................ | H02M 3/33546 |
| 2017/0237356 A1* | 8/2017 | Chen ................ | H02M 3/33553 363/21.02 |
| 2018/0367029 A1 | 12/2018 | Maruyama | |
| 2019/0260290 A1* | 8/2019 | Maejima ................ | G01R 31/52 |
| 2019/0271999 A1* | 9/2019 | Peng ........................ | G05F 1/56 |

(Continued)

FOREIGN PATENT DOCUMENTS

| | | | | |
|---|---|---|---|---|
| CN | 107547964 A | * | 1/2018 | |
| DE | 102013104084 B3 | * | 9/2014 | ......... H05B 33/0815 |
| JP | H07274499 A | | 10/1995 | |

(Continued)

*Primary Examiner* — Sisay G Tiku
(74) *Attorney, Agent, or Firm* — Rabin & Berdo. P.C.

(57) ABSTRACT

An integrated circuit for a power supply circuit of a resonant type, the power supply circuit including a resonant circuit including a coil and a capacitor coupled in series, and a switching device controlling a resonant current flowing through the resonant circuit. The integrated circuit is configured to drive the switching device, and includes: a terminal configured to receive a voltage corresponding to the resonant current; a first voltage output circuit configured to output a first voltage obtained by multiplying the voltage at the terminal by a first factor; a second voltage output circuit configured to output a second voltage obtained by multiplying the voltage at the terminal by a second factor smaller than the first factor; and a driver circuit configured to drive the switching device, based on the first and second voltages, and a feedback voltage corresponding to an output voltage of the power supply circuit.

8 Claims, 10 Drawing Sheets

(56) References Cited

U.S. PATENT DOCUMENTS

| | | | |
|---|---|---|---|
| 2020/0169175 A1* | 5/2020 | Chen ....................... | H02M 1/08 |
| 2020/0169176 A1 | 5/2020 | Murata et al. | |

FOREIGN PATENT DOCUMENTS

| | | | | |
|---|---|---|---|---|
| JP | 2019004577 A | 1/2019 | | |
| WO | WO-2016117230 A1 * | 7/2016 | .............. | H02M 1/08 |
| WO | 2019155733 A1 | 8/2019 | | |

* cited by examiner

INTEGRATED CIRCUIT AND POWER SUPPLY CIRCUIT

CROSS-REFERENCE TO RELATED APPLICATION

The present application claims priority pursuant to 35 U.S.C. § 119 from Japanese patent application number 2022-019111 filed on Feb. 9, 2022, the entire disclosure of which is hereby incorporated by reference herein.

BACKGROUND

Technical Field

The present disclosure relates to an integrated circuit and a power supply circuit.

Description of the Related Art

Integrated circuits for controlling LLC current resonant converters generally drive switching devices based on resonant currents (for example, WO2016/117230, Japanese Patent Application Publication Nos. H7-274499 and 2019-004577, and WO2019/155733).

Such an integrated circuit as described above may change the driving pattern of a switching device according to the magnitude of a resonant current. Specifically, responsive to a load becoming under light load condition, the integrated circuit intermittently drive the switching device. However, in general, when the load becomes under light load condition, the resonant current decreases, which makes it difficult to detect the resonant current.

SUMMARY

A first aspect of an embodiment of the present disclosure is an integrated circuit for a power supply circuit of a resonant type, the power supply circuit including a resonant circuit including a coil and a capacitor coupled in series, and a switching device configured to control a resonant current flowing through the resonant circuit, the integrated circuit being configured to drive the switching device, the integrated circuit comprising: a first terminal configured to receive a voltage corresponding to the resonant current; a first voltage output circuit configured to output a first voltage obtained by multiplying the voltage at the first terminal by a first factor; a second voltage output circuit configured to output a second voltage obtained by multiplying the voltage at the first terminal by a second factor smaller than the first factor; and a driver circuit configured to drive the switching device based on the first voltage, the second voltage, and a feedback voltage corresponding to an output voltage of the power supply circuit.

A second aspect of an embodiment of the present disclosure is a power supply circuit of a resonant type, the power supply circuit comprising: a resonant circuit including a coil and a capacitor coupled in series; a switching device configured to control a resonant current flowing through the resonant circuit; and an integrated circuit configured to switch the switching device, the integrated circuit including a first terminal configured to receive a voltage corresponding to the resonant current, a first voltage output circuit configured to output a first voltage obtained by multiplying the voltage at the first terminal by a first factor, a second voltage output circuit configured to output a second voltage obtained by multiplying the voltage at the first terminal by a second factor smaller than the first factor, and a driver circuit configured to drive the switching device, based on the first voltage, the second voltage, and a feedback voltage corresponding to an output voltage of the power supply circuit.

BRIEF DESCRIPTION OF THE DRAWINGS

FIG. 2 is a diagram illustrating an example of a control IC 40a.

FIG. 4 is a diagram illustrating an example of a voltage generator circuit 72a.

FIG. 7 is a chart illustrating an example of the operation of a control IC 40a.

DETAILED DESCRIPTION

At least following matters will become apparent from the descriptions of the present specification and the accompanying drawings.

Embodiments

<<<Overview of Switching Power Supply Circuit 10>>>

Figure 1:
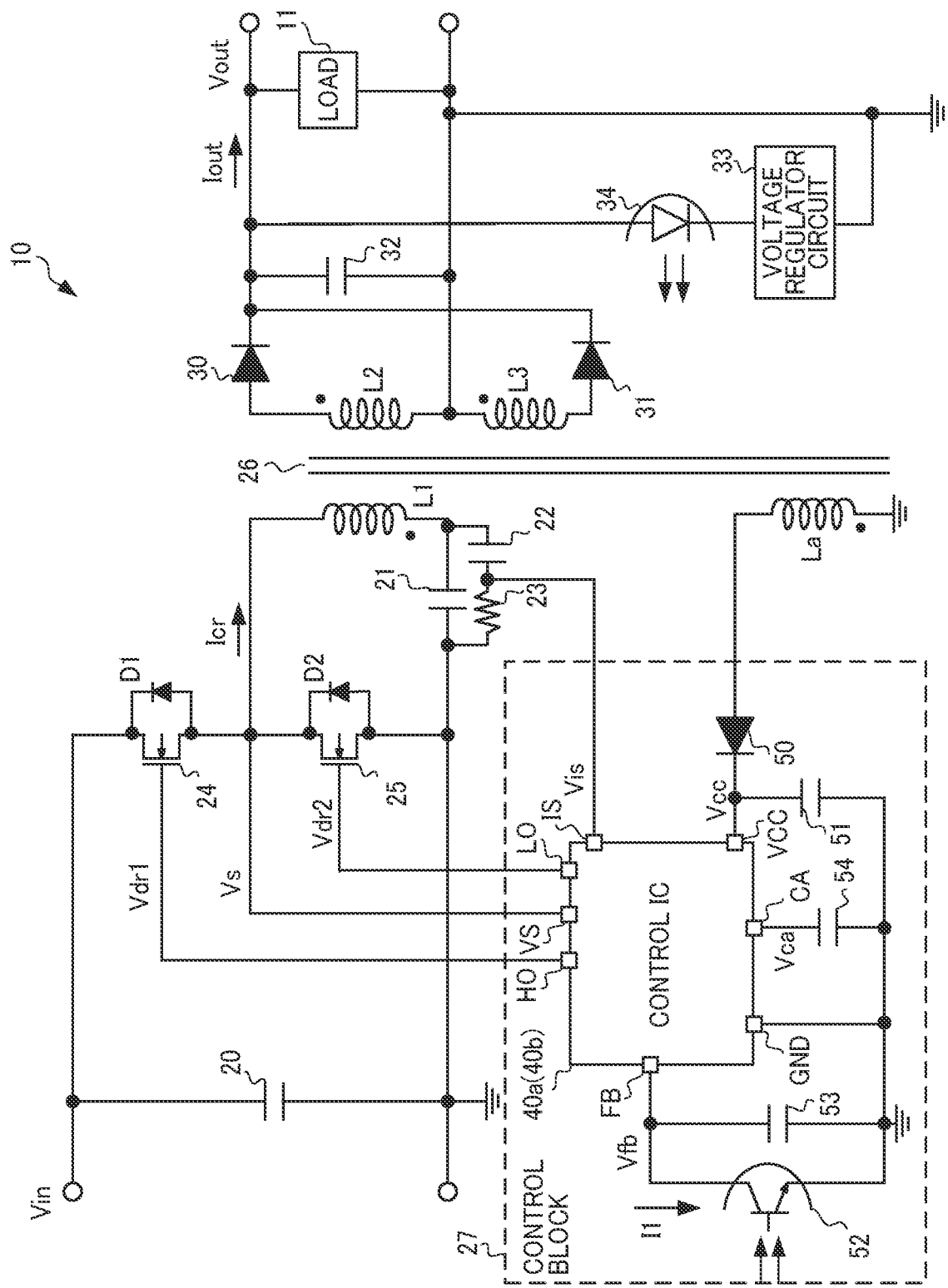
FIG. 1 is a diagram illustrating an example of an AC-DC converter 10.

FIG. 1 is a diagram illustrating a configuration example of a switching power supply circuit 10 according to an embodiment of the present disclosure. The switching power supply circuit 10 is an LLC current resonant power supply circuit that generates an output voltage Vout of a target level at a load 11 from a predetermined input voltage Vin.

The switching power supply circuit 10 includes capacitors 20, 21, 22, 32, a resistor 23, NMOS transistors 24, 25, a transformer 26, a control block 27, diodes 30, 31, a voltage regulator circuit 33, and a light-emitting diode 34.

The capacitor 20 stabilizes the voltage between a power supply line to receive the voltage Vin and a ground line on the ground side, to thereby remove noise and the like. Note that the input voltage Vin is a direct-current (DC) voltage of a predetermined level. The capacitor 21 is a so-called resonant capacitor configuring a resonant circuit with a leakage inductance and an excitation inductance based on a primary coil L1 and the secondary coils L2, L3 of the transformer 26.

The capacitor 22 and the resistor 23 configure a shunt circuit that shunts and detects a resonant current Icr flowing through the capacitor 21. The capacitor 22 and the resistor 23, which are coupled in series, are coupled in parallel with the capacitor 21.

The resistor 23 generates a voltage Vis, based on a current obtained by shunting the resonant current Icr. Accordingly, the voltage Vis results in a voltage corresponding to the resonant current Icr. Note that the resonant current Icr when flowing in the direction given in FIG. 1 is referred to as positive resonant current Icr, and the voltage Vis in this case is a positive voltage.

When the resonant current Icr flows in the direction of the arrow, in other words, when the resonant current Icr flows in the order of the primary coil L1, the capacitor 22, and the resistor 23, the direction of the resonant current Icr is positive. Meanwhile, when the resonant current Icr flows in the direction opposite to the direction of the arrow, in other words, when the resonant current Icr flows in the order of the resistor 23, the capacitor 22, and the primary coil L1, the direction of the resonant current Icr is negative.

The NMOS transistor 24 is a high-side power transistor, and the NMOS transistor 25 is a low-side power transistor. Specifically, the NMOS transistors 24, 25 are coupled in series between a node to receive the input voltage Vin and a node to receive a ground voltage. In an embodiment of the present disclosure, the NMOS transistors 24, 25 are used as a switching device. However, for example, P-channel metal-oxide-semiconductor (PMOS) transistors or bipolar transistors may be used instead of the NMOS transistors 24, 25. Note that the NMOS transistors 24, 25 correspond to a "switching device".

The transformer 26 includes the primary coil L1, the secondary coils L2, L3, and an auxiliary coil La. The primary coil L1, the secondary coils L2, L3, and the auxiliary coil La are insulated from one another. In the transformer 26, voltages are generated in the secondary coils L2, L3 on the secondary side and the auxiliary coil La, according to variation in the voltage at the primary coil L1 on the primary side.

The primary coil L1 has one end to which the source of the NMOS transistor 24 and the drain of the NMOS transistor 25 are coupled, and the other end to which the source of the NMOS transistor 25 is coupled through the capacitor 21.

Accordingly, upon start of switching of the NMOS transistors 24, 25, each of the voltages at the secondary coils L2, L3 and the auxiliary coil La varies. Note that the primary coil L1 and the secondary coils L2, L3 are electromagnetically coupled with different polarities, and the primary coil L1 and the auxiliary coil La are electromagnetically coupled with the same polarity.

The control block 27 is a circuit block that controls switching of the NMOS transistors 24, 25, which will be described later in detail.

The diodes 30, 31 rectify the voltages at the secondary coils L2, L3, and the capacitor 32 soothes the rectified voltages. As a result, the output voltage Vout having been smoothed is generated at the capacitor 32. Note that the output voltage Vout results in a DC voltage of a target level.

The voltage regulator circuit 33 generates a constant DC voltage, and is configured using, for example, a shunt regulator.

The light-emitting diode 34 is an element to emit light with an intensity corresponding to a difference between the output voltage Vout and the output of the voltage regulator circuit 33, and configures a photocoupler with a phototransistor 52 which will be described later. In an embodiment of the present disclosure, the intensity of the light from the light-emitting diode 34 increases with a rise in the level of the output voltage Vout.

<<<Control Block 27>>>

The control block 27 includes a control IC 40a, a diode 50, capacitors 51, 53, 54, and the phototransistor 52.

The control IC 40a is an integrated circuit that controls switching of the NMOS transistors 24, 25, and has terminals VCC, GND, FB, IS, CA, HO, LO, VS.

The terminal VCC is a terminal to which a power supply voltage Vcc to operate the control IC 40a is applied, and to which the cathode of the diode 50 and the capacitor 51 having one end grounded are coupled. Then, the capacitor 51 is charged with the voltage from the auxiliary coil La of the transformer 26, resulting in the voltage Vcc. Note that the control IC 40a is activated upon application of the divided voltage of the input voltage Vin obtained by rectifying an alternating current (AC) input through a terminal (not illustrated), and after being activated, the control IC 40a operates based on the power supply voltage Vcc.

The terminal GND is a terminal to which the ground voltage is applied, and to which, for example, the housing of a device where the switching power supply circuit 10 is provided or the like is coupled.

The terminal FB is a terminal at which a feedback voltage Vfb corresponding to the output voltage Vout is generated, and to which the phototransistor 52 and the capacitor 53 are coupled. The phototransistor 52 passes, from the terminal FB to the ground, a bias current I1 having a magnitude corresponding to the intensity of the light from the light-emitting diode 34, and the capacitor 53 is provided to remove noise between the terminal FB and the ground. Thus, the phototransistor 52 operates as a transistor to generate a sink current.

The terminal IS is a terminal to detect the current value of the resonant current of the primary coil L1. Here, the voltage corresponding to the current value of the resonant current of the primary coil L1 is generated at the node at which the capacitor 22 and the resistor 23 are coupled. Thus, the voltage Vis corresponding to the current value of the resonant current of the primary coil L1 is applied to the terminal IS.

The terminal CA is a terminal to which a voltage Vca is applied. The voltage Vca is generated based on the resonant current of the primary coil L1, and corresponds to the input power of the switching power supply circuit 10 (i.e., power of the load 11). Note that the capacitor 54 is coupled to the terminal CA, which will be described later in detail.

The terminal HO is a terminal through which a driving signal Vdr1 to drive the NMOS transistor 24 is outputted, and to which the gate of the NMOS transistor 24 is coupled.

The terminal LO is a terminal through which a driving signal Vdr2 for driving the NMOS transistor 25 is outputted, and to which the gate of the NMOS transistor 25 is coupled.

The terminal VS is a terminal to receive a voltage at the coupling node at which the source terminal of the NMOS transistor 24 and the drain terminal of the NMOS transistor 25 are coupled. Upon turning on of the NMOS transistor 24, the input voltage Vin is applied, and upon turning on of the NMOS transistor 25, the ground voltage is applied.

The potential of a voltage Vs at the terminal VS is the reference potential of the output voltage of a bootstrap circuit (not illustrated) for turning on the NMOS transistor 24 when the input voltage Vin is being applied to the terminal VS.

<<<Details of Control IC 40a>>>

Figure 2:
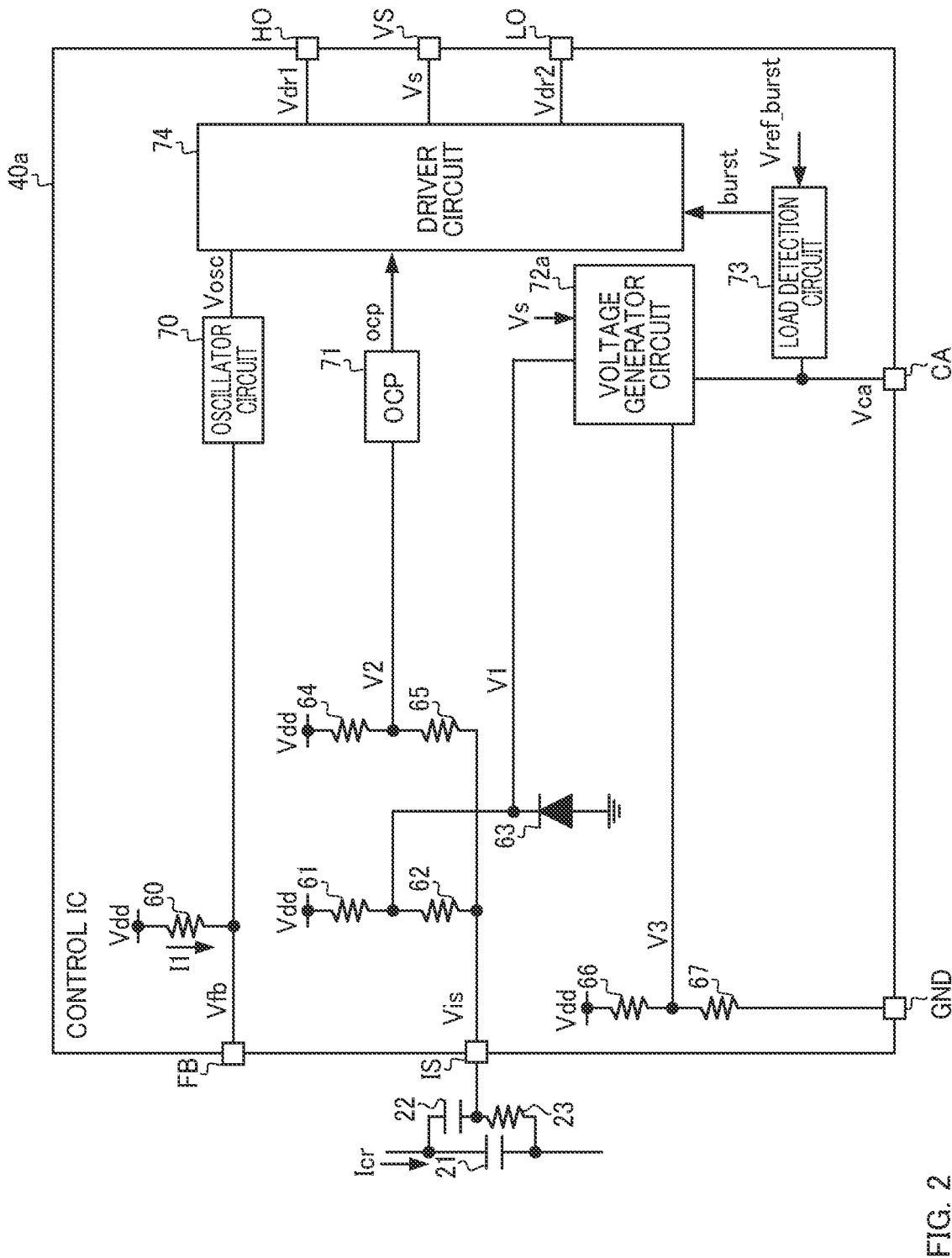

FIG. 2 is a diagram illustrating an example of the control IC 40a. The control IC 40a is an integrated circuit that switches the NMOS transistors 24, 25, based on the magnitude of the resonant current Icr. The control IC 40a includes resistors 60 to 62, 64 to 67, a diode 63, an oscillator circuit 70, an overcurrent protection circuit (OCP) 71, a voltage generator circuit 72a, a load detection circuit 73, and a driver circuit 74. Note that the terminal VCC is omitted here for convenience.

==Resistor 60==

The resistor 60 generates the feedback voltage Vfb, based on the bias current I1 from the phototransistor 52. Note that the resistor 60 has one end to receive a predetermined voltage Vdd outputted by an internal power supply (not illustrated) of the control IC 40a, and the other end coupled to the terminal FB. Thus, the feedback voltage Vfb generated at the terminal FB is given by an expression (1):

$$Vfb = Vdd - R \times I1 \qquad (1)$$

where R is the resistance value of the resistor 60.

As described above, in an embodiment of the present disclosure, the current value of the bias current I1 increases with a rise in the output voltage Vout. Thus, upon a rise in the output voltage Vout, the feedback voltage Vfb drops.

==Resistors 61, 62==

The resistors 61, 62 output a voltage V1 to facilitate detection of the voltage Vis when the resonant current Icr is small. The resistors 61, 62 output the voltage V1 obtained by multiplying the voltage Vis at the terminal IS by a factor of A1. Specifically, the resistors 61, 62 configure a voltage divider resistor circuit that divides a difference ΔVis between the predetermined voltage Vdd and the voltage Vis by a voltage division ratio corresponding to a factor of A1, to thereby output a resultant voltage as the voltage V1.

In addition, the resistors 61, 62 are coupled in series between a node to receive the predetermined voltage Vdd and the terminal IS, and output the voltage V1 from a coupling point of the resistors 61 and 62. Further, assuming that the resistance value of the resistor 61 is a resistance value of 4×R1 and the resistance value of the resistor 62 is a resistance value of R1, A1 results in 0.8, which will be described later in detail. Note that the terminal IS corresponds to a "first terminal", the resistors 61, 62 correspond to a "first voltage output circuit" and a "first voltage divider resistor circuit". In addition, the voltage V1 corresponds to a "first voltage", and the difference ΔVis corresponds to a "first difference". Further, a factor of A1 corresponds to a "first factor".

==Diode 63==

Even if the voltage at the coupling point of the resistors 61 and 62 becomes a negative voltage, the diode 63 prevents the voltage from dropping by more than an amount corresponding to a forward voltage. Thus, the diode 63 has a cathode coupled to the coupling point of the resistors 61 and 62, and an anode grounded.

==Resistors 64, 65==

The resistors 64, 65 output a voltage V2 to detect the voltage Vis when the resonant current Icr is large. Specifically, the resistors 64, 65 output the voltage V2 obtained by multiplying the voltage Vis at the terminal IS by a factor of A2. Further, the resistors 64, 65 configure a voltage divider resistor circuit that divides the difference ΔVis by a voltage division ratio corresponding to a factor of A2, to thereby output a resultant voltage as the voltage V2.

In addition, the resistors 64, 65 are coupled in series between the node to receive the predetermined voltage Vdd and the terminal IS, and output the voltage V2 from a coupling point of the resistors 64 and 65. Further, assuming that the resistance value of the resistors 64, 65 is the resistance value R2, A2 results in 0.5. Note that "a factor of A2" in an embodiment of the present disclosure is smaller than "a factor of A1". Further, the resistors 64, 65 correspond to a "second voltage output circuit" and a "second voltage divider resistor circuit", the voltage V2 corresponds to a "second voltage". Further, a factor of A2 corresponds to a "second factor".

<<<Operations of Resistors 61, 62, 64, 65 and Diode 63>>>

Figure 3:
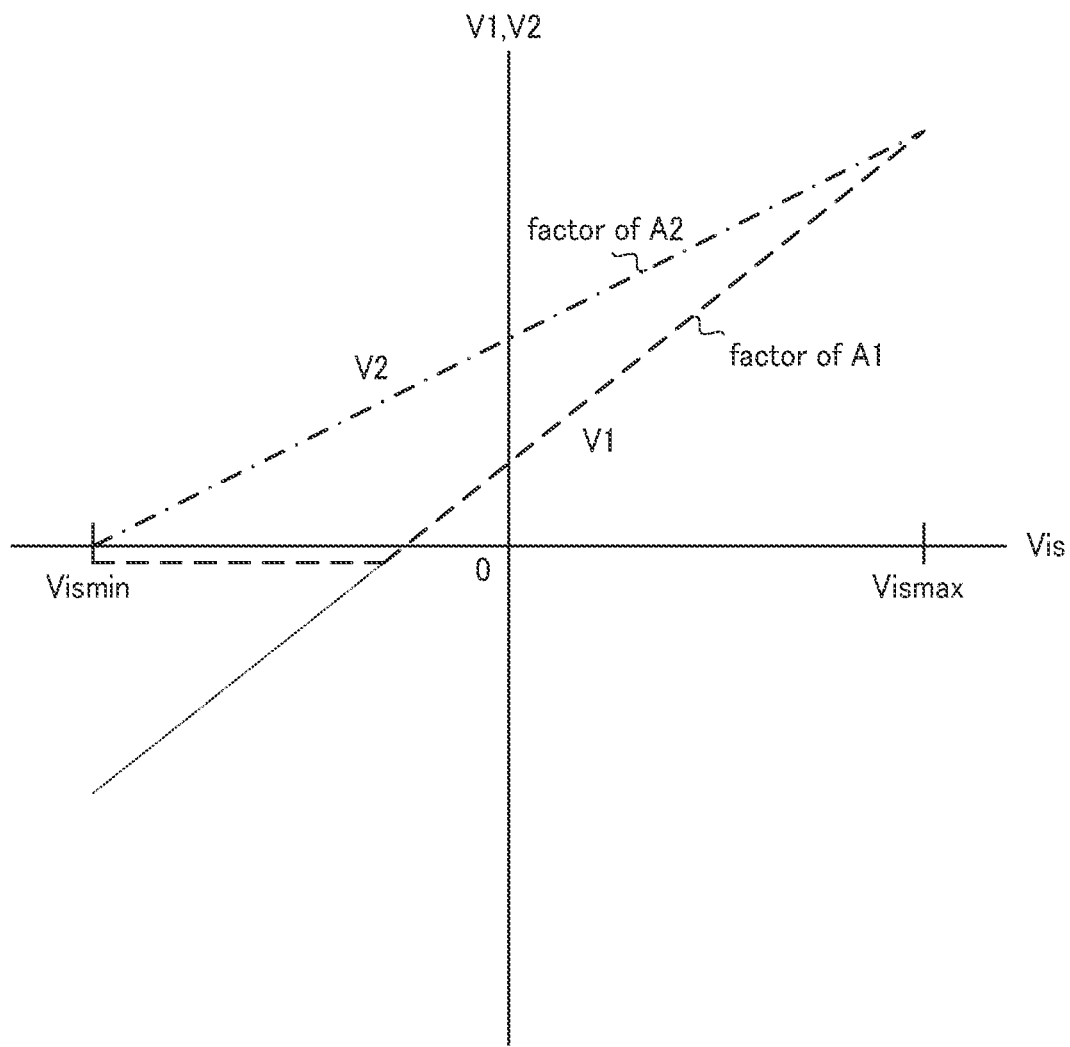
FIG. 3 is a chart illustrating an example of a relationship between a voltage Vis and a voltages V1, V2.

FIG. 3 is a chart illustrating an example of a relationship between the voltage Vis and the voltages V1, V2. The resistors 61, 62 multiply the difference ΔVis between the predetermined voltage Vdd (e.g., 5 V) and the voltage Vis by a factor of A1, to thereby output a resultant voltage as the voltage V1. In other words, the voltage V1 is a voltage obtained by dividing the difference ΔVis by a voltage division ratio determined by the resistance value of the resistors 61, 62.

As described above, it is assumed, for example, that the resistance value of the resistor 61 is 4×R1, and the resistance value of the resistor 62 is R1. In this case, as illustrated in FIG. 3, when the voltage Vis changes in a range from a voltage Vismin to a voltage Vismax (e.g., −5 V to 5 V), the voltage V1 changes in a range from −3 V to 5 V, without the diode 63 being provided. Note that "A1" in this case results in 0.8.

Then, in response to the voltage Vis dropping below, for example, −1.25 V, the voltage V1 results in a negative voltage. Further, if the voltage V1 drops below −0.3 V, for example, a parasitic element may operate in the internal circuit of the control IC, which may cause a malfunction of the circuit.

Accordingly, in an embodiment of the present disclosure, the diode 63 is coupled between the coupling point of the resistors 61 and 62 and the ground as illustrated in FIG. 2. This causes the voltage V1 to be clamped at the voltage that has dropped from the ground voltage by a forward voltage, thereby minimizing a malfunction of the internal circuit of the control IC 40a. Further, without using a negative voltage, the circuit of the control IC 40a can be designed in a simplified manner. Further, with the combination of the resistors 61, 62 and the diode 63, the voltage V1 changes according to the voltage Vis as given by the dotted line in FIG. 3.

In addition, the resistors 64, 65 multiply the difference ΔVis between the predetermined voltage Vdd (e.g., 5 V) and the voltage Vis by a factor of A2, to thereby output a resultant voltage as the voltage V2. In other words, the voltage V2 is a voltage obtained by dividing the difference ΔVis by a voltage division ratio determined by the resistance value of the resistors 64, 65.

It is assumed, for example, that the resistance value of the resistor 64 is R2, and the resistance value of the resistor 65 is R2. In this case, as illustrated in FIG. 3, when the voltage Vis changes in a range from the voltage Vismin to the voltage Vismax (e.g., −5 V to 5 V), the voltage V2 changes in a range from 0 V to 5 V, as given by the dashed-dotted line in FIG. 3. Note that "A2" in this case results in 0.5.

As described above, even if the resonant current Icr is small (e.g., the voltage Vis changes in a range of 0 V±100 mV), the resistors 61, 62 multiply the difference ΔVis by "a factor of A1 (e.g., a factor of 0.8)", and thus the voltage V1 changes in a range of 1 V±80 mV.

Meanwhile, the resistors 64, 65 multiply the difference ΔVis by "a factor of A2 (e.g., a factor of 0.5)", and thus when the voltage Vis changes similarly to the above, the voltage V2 changes in a range of 2.5 V±50 mV. Accordingly, when the resonant current Icr is small, the use of the voltage V1 makes it easier for the control IC 40a to detect a change in the voltage Vis.

However, when the voltage Vis corresponding to the resonant current Icr that is an overcurrent is a large negative voltage (e.g., the voltage Vis=Vismin), the use of the voltage V1 from the resistors 61, 62 makes it difficult to detect an overcurrent, based on the voltage Vis, and the overcurrent protection circuit (OCP) 71 will be described later.

Thus, to detect the voltage Vis when the resonant current Icr is an overcurrent, the voltage divider resistor circuit configured with the resistors 64, 65 is provided other than the voltage divider resistor circuit configured with the resistors 61, 62.

Further, when the voltage range of the internal circuit of the control IC 40a is not limited, A1 may be set larger and the voltage based on the voltage Vis may be generated only by the resistors 61, 62. However, in reality, the voltage range is limited to a narrow range. Thus, in an embodiment of the present disclosure, the resistors 61, 62 and the resistors 64, 65 are provided separately.

==Resistors 66, 67==

The resistors 66, 67 in FIG. 2 divide the predetermined voltage Vdd by a voltage division ratio corresponding to a factor of A1, to thereby output a resultant voltage as a voltage V3. Specifically, the resistors 66, 67 configure a voltage divider resistor circuit that divides a difference ΔVgnd between the predetermined voltage Vdd and the ground voltage by the voltage division ratio corresponding to a factor of A1, to thereby output a resultant voltage as the voltage V3. Further, the resistors 66, 67 are coupled in series between a node to receive the predetermined voltage Vdd and the terminal GND, to thereby output the voltage V3 from a coupling point of the resistors 66 and 67. Further, the voltage V3 is used for the voltage generator circuit 72a (described later) to precisely output the voltage Vca, which will be described later. Note that the resistors 66, 67 correspond to a "third voltage divider resistor circuit", the difference ΔVgnd corresponds to a "second difference", and the voltage V3 corresponds to a "third voltage".

==Oscillator Circuit 70==

The oscillator circuit 70 is a voltage control oscillator circuit that outputs an oscillator signal Vosc to switch the NMOS transistors 24, 25 to the driver circuit 74 (described later), based on the inputted feedback voltage Vfb. The oscillator signal Vosc has, for example, 50% high-level (hereinafter, referred to as high or high level) duty cycle. Note that the oscillator circuit 70 outputs the oscillator signal Vosc with a high frequency, in response to the level of the voltage Vfb dropping.

==Overcurrent Protection Circuit (OCP) 71==

The overcurrent protection circuit 71 detects whether the resonant current Icr is an overcurrent. Specifically, the overcurrent protection circuit 71 detects whether the resonant current Icr is an overcurrent, based on the voltage V2. In addition, the overcurrent protection circuit 71 detects that the resonant current Icr is an overcurrent, in response to the voltage V2 becoming out of a predetermined range. Note here that the "overcurrent" means that a current large enough to break one of the NMOS transistor 24 or 25 if flowing through one of the NMOS transistor 24 or 25 (e.g., a current larger than a predetermined rated current). Further, the "predetermined range" is a range of the voltage V2 when the resonant current Icr is not an overcurrent.

In addition, the overcurrent protection circuit 71 outputs a signal ocp to stop switching the NMOS transistor 24 or 25 to the driver circuit 74, in response to the resonant current Icr becoming overcurrent. Meanwhile, the overcurrent protection circuit 71 outputs the signal ocp to switch the NMOS transistor 24 or 25 to the driver circuit 74, when the resonant current Icr is not an overcurrent. Note that the overcurrent protection circuit 71 corresponds to a "first detection circuit".

==Voltage Generator Circuit 72a==

The voltage generator circuit 72a generates, at the terminal CA, the voltage Vca indicating the condition of the load 11, based on the voltage V1 corresponding to the resonant current Icr and the voltage V3.

Figure 4:
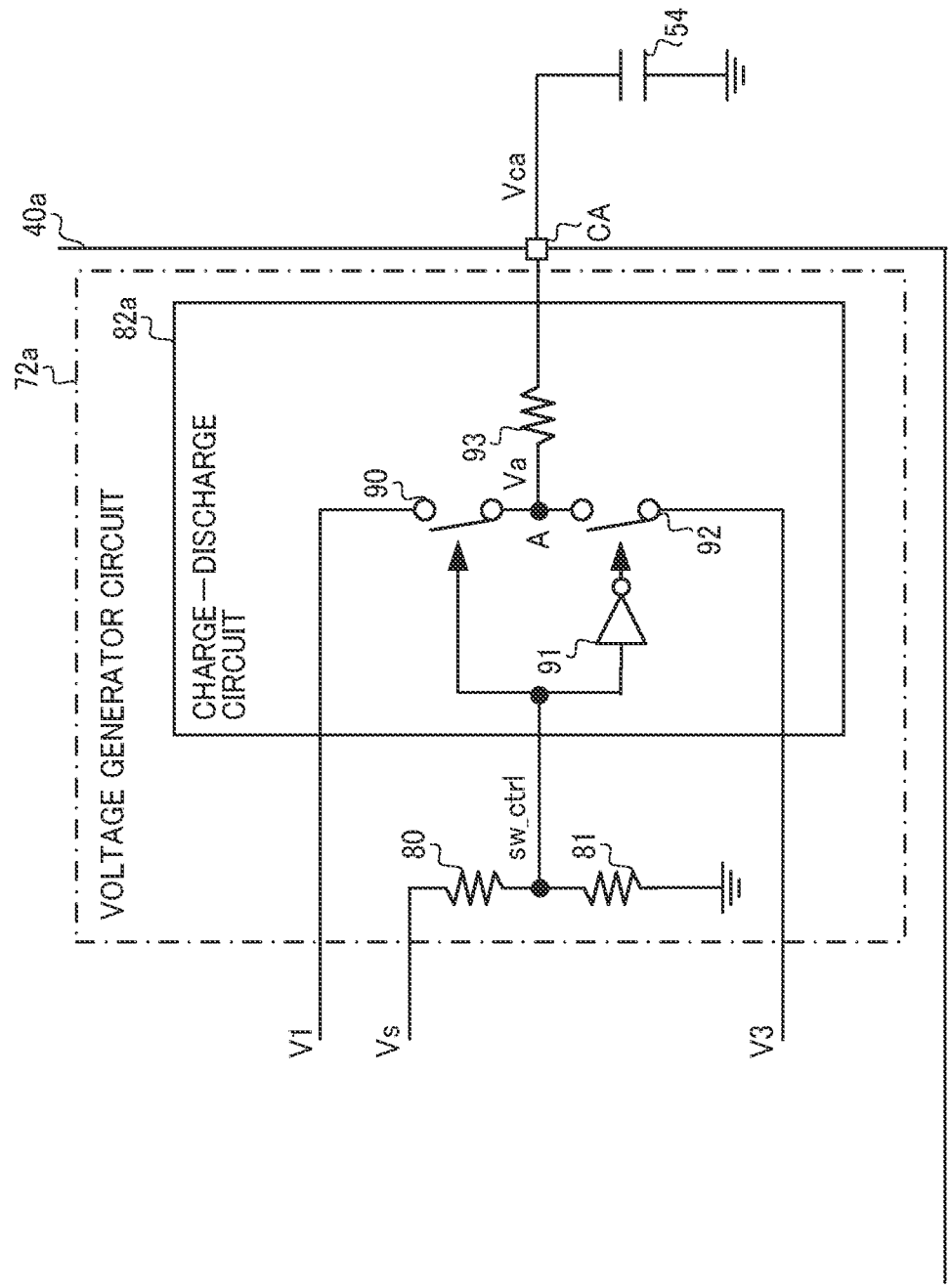

FIG. 4 is a diagram illustrating an example of the voltage generator circuit 72a. The voltage generator circuit 72a includes resistors 80, 81, and a charge-discharge circuit 82a.

===Resistors 80, 81===

The resistors 80, 81 divide the voltage Vs, to thereby generate a signal sw_ctr1. Note that upon turning on of the NMOS transistor 24 and turning off of the NMOS transistor 25, the voltage Vs results in the input voltage Vin, and in response to turning off of the NMOS transistor 24 and turning on of the NMOS transistor 25, the voltage Vs results in the ground voltage. In other words, upon turning on and off of the NMOS transistors 24, 25, the voltage Vs results in either the input voltage Vin or the ground voltage. In association therewith, upon turning on and off of the NMOS transistors 24, 25, the signal sw_ctr1 changes the logic level thereof.

===Charge-Discharge Circuit 82a===

The charge-discharge circuit 82a charges and discharges the capacitor 54 with the voltage V1 and the voltage V3, to thereby output the voltage Vca indicating the condition of the load 11. Specifically, the charge-discharge circuit 82a averages the voltage V1 that is detected at the terminal IS and that is based on the voltage Vis corresponding to the resonant current Icr of the primary coil L1, using the capacitor 54 coupled to the terminal CA, to thereby output a resultant voltage indicating the condition of the load 11 as the voltage Vca. Note that the charge-discharge circuit 82a averages the voltage V1 that is based on the positive resonant current Icr, in response to the signal sw_ctr1.

In addition, the charge-discharge circuit 82a changes the voltage at a node A to the voltage V1 or the voltage V3, in response to the signal sw_ctr1. Then, the charge-discharge circuit 82a charges or discharges the capacitor 54 coupled to the terminal CA through a resistor 93 (described later), to thereby output the voltage Vca.

Note that the current value of the resonant current Icr of the primary coil L1 increases according to the input power of the switching power supply circuit 10. Further, the input power of the switching power supply circuit 10 increases according to the power consumed by the load 11. Thus, the voltage Vca rises higher as the load 11 becomes under heavier load condition (i.e., as a load current Iout of the load 11 increases).

Note that the phrase "the load 11 is under heavy load condition" indicates, for example, the case where the current value of the load current Iout flowing through the load 11 is larger than a predetermined value (e.g., 1 A). Further, "the load 11 is in under light load condition" indicates, for example, the case where the current value of the load current Iout flowing through the load 11 is lower than the predetermined value (e.g., 1 A). Further, "the load 11 is under no load condition" indicates the case where the current value of the load current Iout flowing through the load 11 is extremely small or 0 (zero) A. Further, a description has been given such that the current value of the load current Iout for determining whether the load 11 is under heavy load condition or light load condition is, for example, 1 A, however this current value can be set variously.

The charge-discharge circuit 82a includes switches 90, 92, an inverter 91, and the resistor 93.

The switch 90 is an element that is tuned on upon receipt of the high signal sw_ctrl. Upon turning on of the switch 90, a voltage Va at the node A at which the switches 90, 92 are coupled results in the voltage V1.

The switch 92 is an element that is turned on upon receipt of the high signal from the inverter 91 that receives the signal sw_ctrl of a low level (hereinafter, low or low level). Then, upon turning on of the switch 92, the voltage Va at the node A results in the voltage V3. Further, the reason why the voltage V3 is applied to the node A is that if, for example, the ground voltage is applied to the node A upon turning on of the switch 92, the capacitor 54 is excessively discharged, which makes it impossible for the voltage generator circuit 72a to output the precise voltage Vca corresponding to the condition of the load 11.

Then, the resistor 93 is coupled between the node A and the terminal CA, and the resistor 93 and the capacitor 54 coupled to the terminal CA configure an RC integrator circuit that operates with a "time constant $\tau$". Here, the "time constant $\tau$" can be given as "time constant $\tau$"=R3×C1, where R3 is the resistance value of the resistor 93, and C1 is the capacitance value of the capacitor 54. It is assumed that the "time constant $\tau$" is sufficiently longer than the period of the driving signals Vdr1, Vdr2 for driving the NMOS transistors 24, 25.

Accordingly, the charge-discharge circuit 82a charges the capacitor 54, through the resistor 93, with the voltage V1 that is based on the positive resonant current Icr corresponding to the power consumption of the load 11, upon receipt of the high signal sw_ctrl.

On the other hand, the charge-discharge circuit 82a discharges the capacitor 54, through the resistor 93, with the voltage V3, upon receipt of the low signal sw_ctrl. Note that since the voltage V1 is generated by dividing the difference ΔVis, the voltage V1 does not reach 0V even if the voltage Vis reaches 0 V, and thus the voltage at the node A is the voltage V3 when the capacitor 54 is discharged, as described above. This minimizes excessive discharge of the capacitor 54, thereby being able to output the voltage Vca precisely indicating the condition of the load 11.

As has been described above, the charge-discharge circuit 82a is capable of averaging the voltage V1, to thereby output the voltage Vca indicating the condition of the load 11. Note that the terminal CA corresponds to a "second terminal", and the voltage Vca corresponds to a "voltage at the second terminal".

==Load Detection Circuit 73==

The load detection circuit 73 in FIG. 2 detects the condition of the load 11, based on the voltage Vca. Specifically, the load detection circuit 73 outputs, to the driver circuit 74, a high signal burst to intermittently switch the NMOS transistors 24, 25, in response to the voltage Vca being lower than a voltage Vref_burst of a predetermined level and the load 11 being under light load condition.

On the other hand, the load detection circuit 73 outputs, to the driver circuit 74, the low signal burst to continually switch the NMOS transistors 24, 25, in response to the voltage Vca being higher the voltage Vref_burst of the predetermined level and the load 11 not being under light load condition. Note that the details of continually switching and intermittently switching will be described later when describing the driver circuit 74 later. Note that the load detection circuit 73 corresponds to a "second detection circuit".

===Driver Circuit 74===

The driver circuit 74 drives the NMOS transistors 24, 25, based on the voltage V1, the voltage V2 and the feedback voltage Vfb corresponding to the output voltage Vout.

Figure 5:
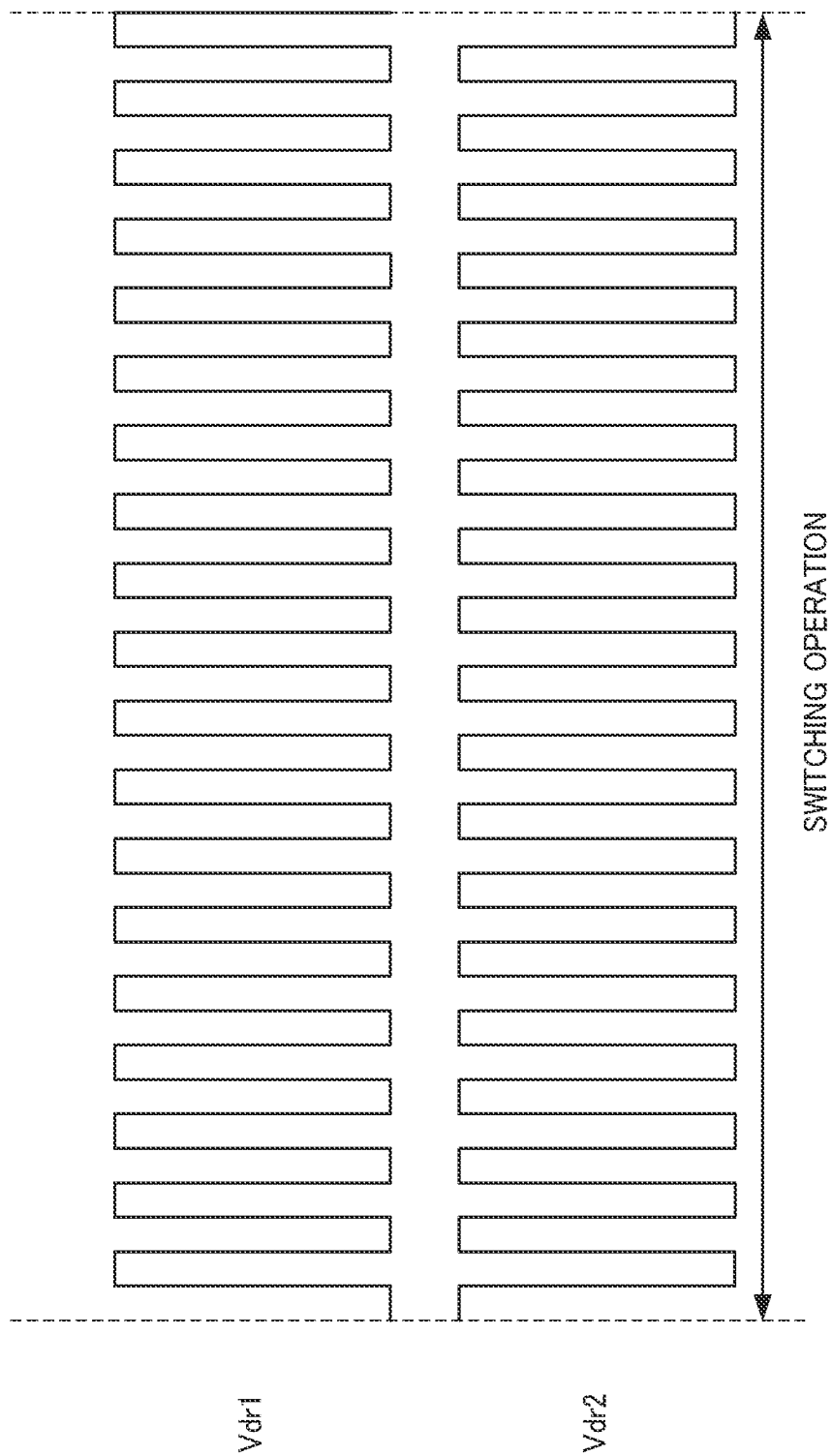
FIG. 5 is a chart illustrating an example of driving signals Vdr1 and Vdr2 when a load 11 is under heavy load condition.

The driver circuit 74 continuously switches the NMOS transistors 24, 25 as illustrated in FIG. 5, in response to the oscillator signal Vosc outputted by the oscillator circuit 70 according to the level of the voltage Vfb, when the load 11 is not under light load condition. In this case, the driver circuit 74 does not intermittently stop the switching operation.

The driver circuit 74 turns off the NMOS transistor 24 or 25, in response to the resonant current Icr reaching overcurrent and the overcurrent protection circuit 71 outputting the signal ocp for stopping switching of the NMOS transistor 24 or 25.

Figure 6:
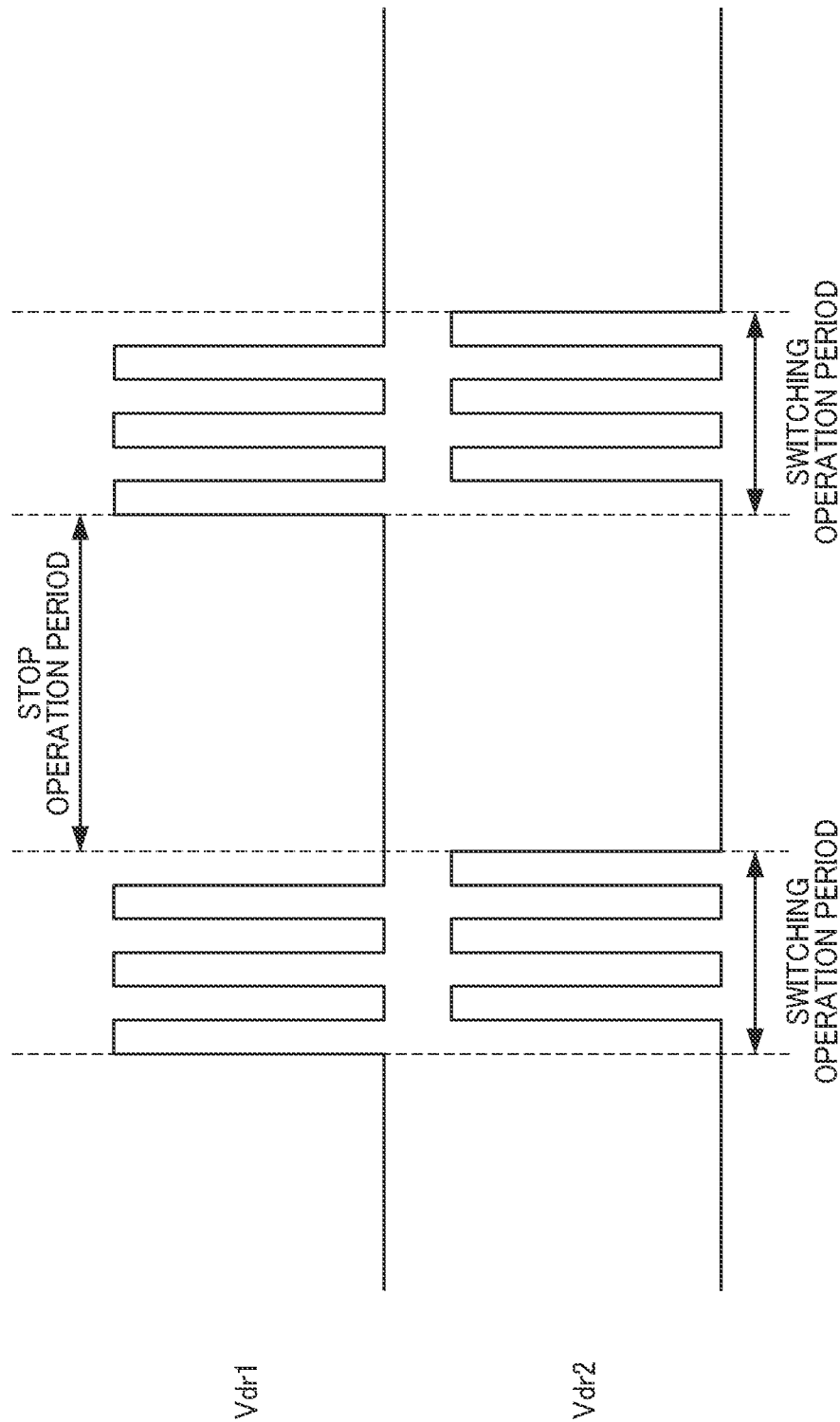
FIG. 6 is a chart illustrating an example of driving signals Vdr1 and Vdr2 when a load 11 is under light load condition.

Further, the driver circuit 74 intermittently switch the NMOS transistors 24, 25 as illustrated in FIG. 6, in response to the load 11 becoming under light load condition and the load detection circuit 73 outputting the high signal burst.

Note that the phrase "intermittently switching" means switching the NMOS transistors 24, 25 so as to alternately repeat a switching operation period during which switching of the NMOS transistors 24, 25 is continuously performed and a stop operation period during which the switching thereof is intermittently stopped.

Further, FIGS. 5 and 6 illustrate such that the driver circuit 74 outputs the driving signals Vdr1, Vdr2 that are generated to have 50% duty cycle corresponding to the oscillator signal Vosc, and that alternatively go high. However, in reality, the driver circuit 74 outputs the driving signals Vdr1, Vdr2 each having a dead time between each change of the driving signal Vdrv1 from high to low and each change of the driving signal Vdr2 from low to high.

Further, the driver circuit 74 outputs the driving signals Vdr1, Vdr2 each similarly having a dead time between each change of the driving signal Vdrv1 from low to high and each change of the driving signal Vdr2 from high to low. As such, the driver circuit 74 outputs the driving signals Vdr1, Vdr2 that are generated to have about 50% duty cycle corresponding to the oscillator signal Vosc, and that alternatively go high.

Note that, FIG. 6 illustrates such that the driving signals Vdr1 and Vdr2 have the same number of pulses during the switching operation, however, it is merely an example, and the number of pulses may be different therebetween. Here, the "dead time" is a time period during which both of the driving signals Vdr1 and Vdr2 are low.

<<Operation of Control IC 40a>>

Figure 7:
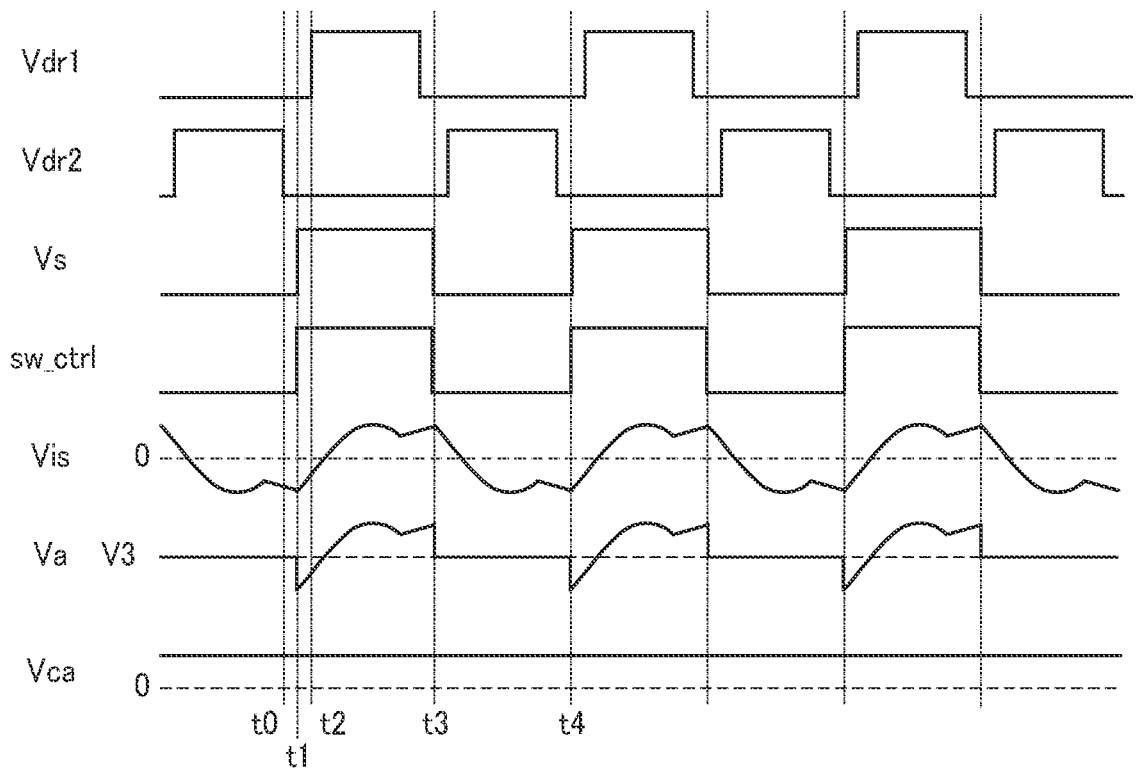

FIG. 7 is a chart illustrating an example of the operation of the control IC 40a.

At time t0, the driver circuit 74 of the control IC 40a outputs the low driving signal Vdr2, to thereby turn off the NMOS transistor 25.

Thereafter, the negative resonant current Icr causes the voltage Vs at the terminal VS to rise and reach the input voltage Vin at time t1. In association therewith, the resistors 80, 81 in FIG. 4 generate the high signal sw_ctrl corresponding to the voltage Vs.

In this event, the switch 90 in FIG. 4 is tuned on in response to the high signal sw_ctrl, and the voltage Va at the node A results in the voltage V1.

At time t2 at which the dead time has elapsed since time t0, the driver circuit 74 outputs the high driving signal Vdr1, to thereby turn on the NMOS transistor 24. Then, the voltage Vis corresponding to the resonant current Icr flowing in the positive direction results in being positive.

At time t3 after the driver circuit 74 outputs the low driving signal Vdr1, the positive resonant current Icr causes the voltage Vs at the terminal VS to drop to 0 V. In association therewith, the resistors 80, 81 in FIG. 4 generate the low signal sw_ctrl corresponding to the voltage Vs.

In this event, the switch 92 in FIG. 4 is turned on in response to the low signal sw_ctrl, and the voltage Va at the node A results in the voltage V3. Then, the same operation is repeated from time t4.

As such, the voltage generator circuit 72a outputs the voltage Vca, based on the voltage V1 outputted by the resistors 61, 62 and the voltage V3 outputted by the resistors 66, 67. With the use of the voltage V1 obtained by multiplying a small variation in the voltage Vis by a factor of A1, the voltage value of the voltage Vca can be a larger voltage value than that when the voltage V2 is used, even when the load 11 is under light load condition. Further, with the use of the voltage V3 obtained by multiplying the voltage Vdd by a factor of A1, the capacitor 54 is not excessively discharged when the switch 92 is on, thereby being able to generate the voltage Vca that is more precise.

Other Embodiments

<<<Details of Control IC 40b>>>

Figure 8:
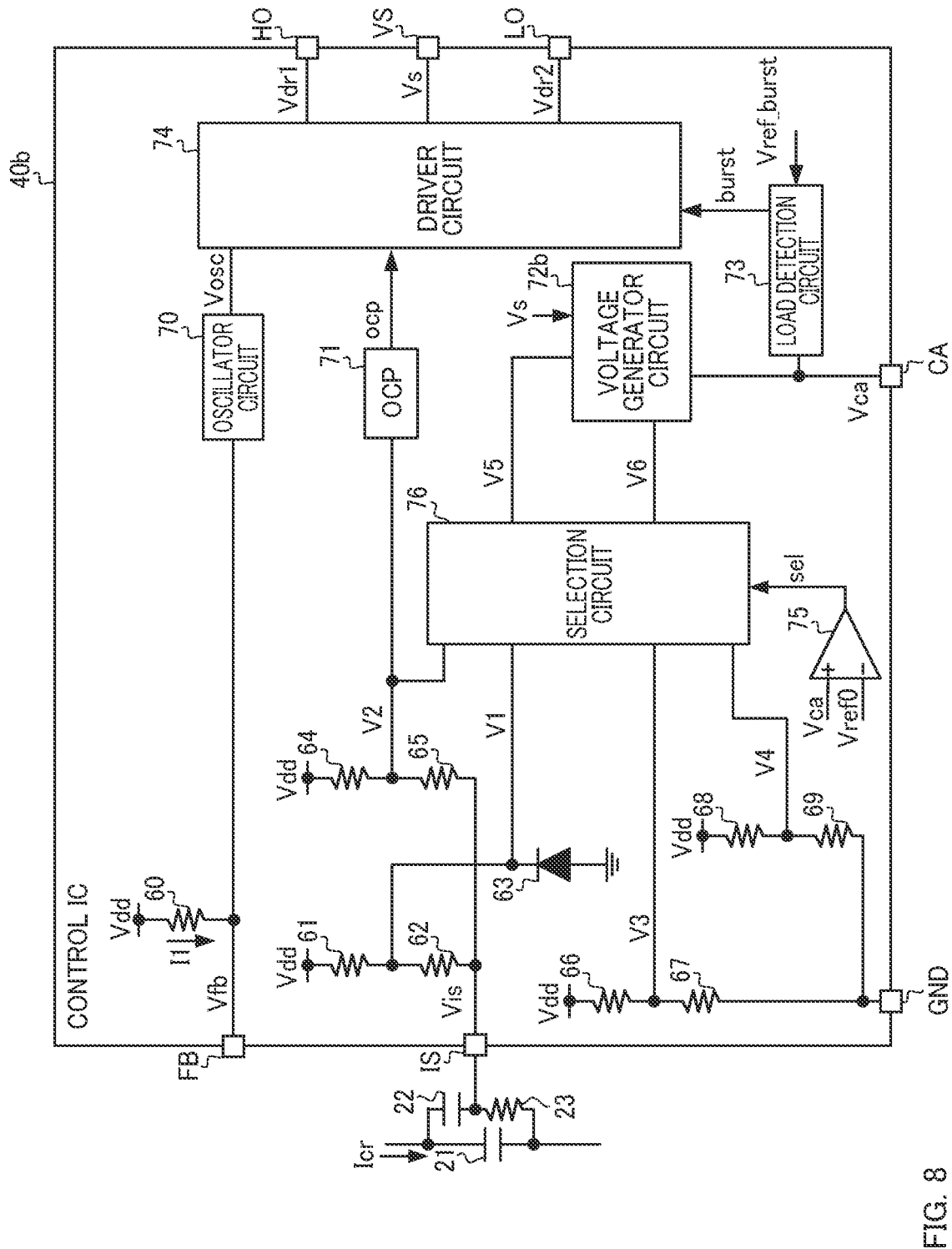
FIG. 8 is a diagram illustrating an example of a control IC 40b.

FIG. 8 is a diagram illustrating an example of a control IC 40b. The control IC 40b is an integrated circuit that switches the NMOS transistors 24, 25, based on the magnitude of the resonant current Icr, similarly to the control IC 40a. Note that, in FIG. 8, parts or elements that are the same as those illustrated in FIG. 2 are given the same reference numerals, and a description thereof is omitted. The control IC 40b further includes resistors 68, 69, a voltage generator circuit 72b, a comparator 75, and a selection circuit 76, in addition to the control IC 40a.

==Resistors 68, 69==

The resistors 68, 69 divide the predetermined voltage Vdd by a voltage division ratio corresponding to a factor of A2, to thereby output a resultant voltage as a voltage V4. Specifically, the resistors 68, 69 configure a voltage divider resistor circuit that divides the difference ΔVgnd between the predetermined voltage Vdd and the ground voltage by the voltage division ratio corresponding to a factor of A2, to thereby output a resultant voltage as the voltage V4. Further, the resistors 68, 69 are coupled in series between a node to receive the predetermined voltage Vdd and the terminal GND, to thereby output the voltage V4 from a coupling point of the resistors 68 and 69. Further, the voltage V4 is used for the voltage generator circuit 72b (described later) to output the voltage Vca precisely, which will be described later in detail. Note that the resistors 68, 69 correspond to a "fourth voltage divider resistor circuit", and the voltage V4 corresponds to a "fourth voltage".

==Comparator 75==

The comparator 75 determines whether to use the voltages V1, V3 or the voltages V2, V4 when the voltage generator circuit 72b (described later) outputs the voltage Vca, to thereby control the selection circuit 76. Specifically, the comparator 75 determines whether the voltage Vca is higher than a reference voltage Vref0, and to thereby control the selection circuit 76 based on the result of the determination. Further, the level of the reference voltage Vref0 is equal to the level of the voltage Vca when the load 11 is neither under light load condition nor heavy load condition. Note that the comparator 75 corresponds to a "determination circuit".

==Selection Circuit 76==

The selection circuit 76 selects voltages to be applied to the voltage generator circuit 72b, based on the result of the determination of the comparator 75. Specifically, the selection circuit 76 selects the voltage V2 and the voltage V4 when the voltage Vca is higher than the reference voltage Vref0, in other words, when the load 11 is under heavy load condition. On the other hand, the selection circuit 76 selects the voltage V1 and the voltage V3, when the voltage Vca is lower than the reference voltage Vref0, in other words, when the load 11 is under light load condition.

==Voltage Generator Circuit 72b==

The voltage generator circuit 72b detects the condition of the load 11, based on the magnitude of the resonant current Icr. Specifically, the voltage generator circuit 72b generates, at the terminal CA, the voltage Vca indicating the condition of the load 11, based on the voltage selected by the selection circuit 76. In other words, the voltage generator circuit 72b uses the voltages V2, V4 when the load 11 is under heavy load condition, and uses the voltages V1, V3 when the load 11 is under light load condition. Here, the voltage selected between the voltage V1 and the voltage V2 is given as a voltage V5, and the voltage selected between the voltage V3 and the voltage V4 is given as a voltage V6.

Figure 9:
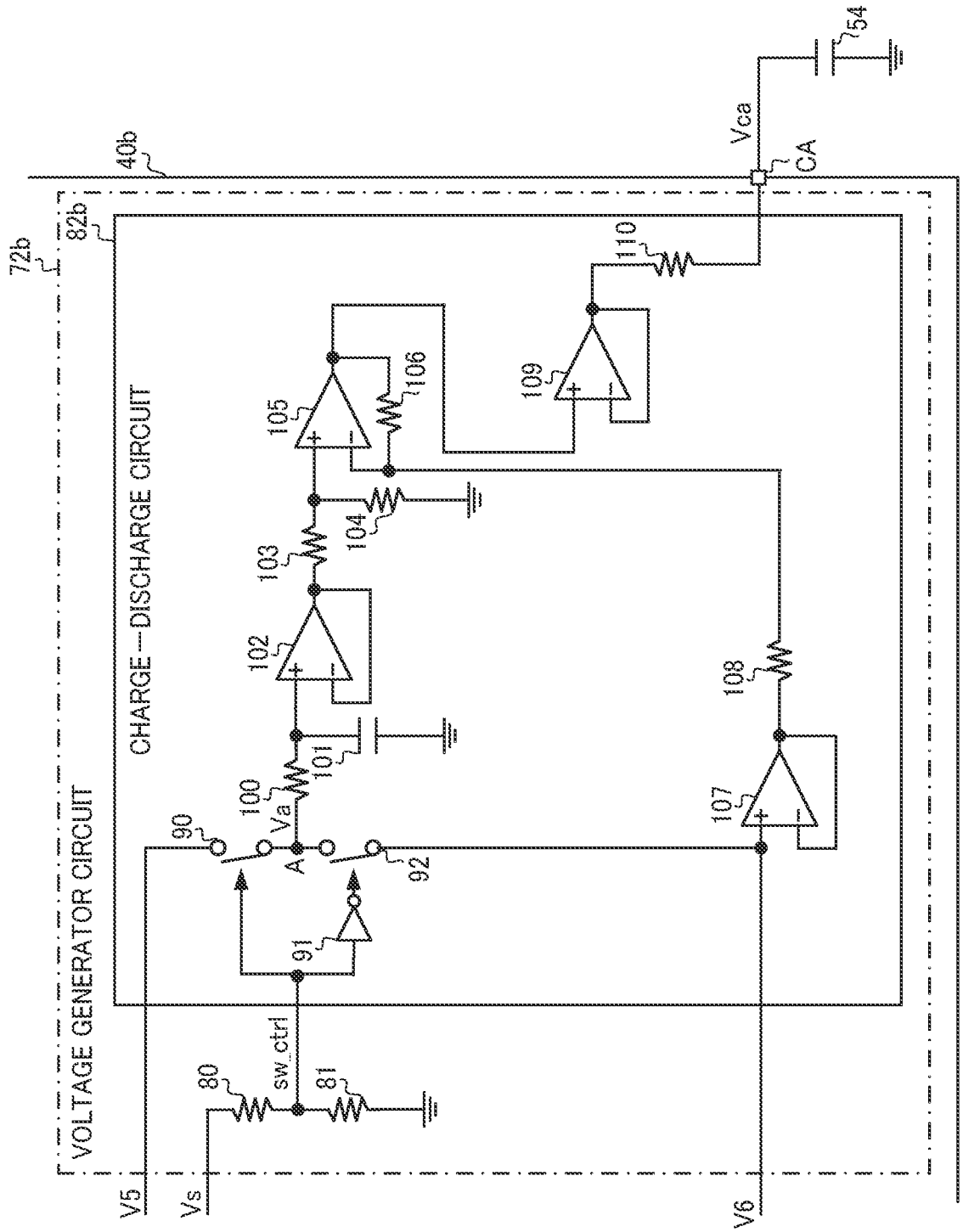
FIG. 9 is a diagram illustrating an example of a voltage generator circuit 72b.

FIG. 9 is a diagram illustrating an example of the voltage generator circuit 72b. The voltage generator circuit 72b includes the resistors 80, 81 and a charge-discharge circuit 82b. Note that the resistors 80, 81 are the same as in the voltage generator circuit 72a.

===Charge-Discharge Circuit 82b===

The charge-discharge circuit 82b charges and discharges the capacitor 54 with the voltage V5 and the voltage V6, to thereby output the voltage Vca indicating the condition of the load 11. Specifically, the charge-discharge circuit 82b outputs the condition of the load 11 as the voltage Vca, from the voltage V5 and the voltage V6, the voltage V5 being based on the voltage Vis corresponding to the resonant current Icr of the primary coil L1 detected at the terminal IS. Note that the charge-discharge circuit 82b averages the voltage V5 that is based on the positive resonant current Icr, in response to the signal sw_ctrl.

The charge-discharge circuit 82b includes the switches 90, 92, the inverter 91, resistors 100, 103, 104, 106, 108, 110, a capacitor 101, and operational amplifiers 102, 105, 107, 109. The charge-discharge circuit 82b turns on/off the switches 90, 92 in response to the signal sw_ctrl, to thereby change the voltage at the node A to the voltage V5 or the voltage V6.

====Resistor 100 and Capacitor 101====

The resistor 100 and the capacitor 101 configure a low-pass filter, and stabilize the voltage Va at the node A.

====Operational Amplifier 102====

The operational amplifier 102 is a unity gain buffer that outputs the voltage Va.

====Operational Amplifiers 105, 107 and Resistors 103, 104, 106, 108====

The operational amplifier 105 and the resistors 103, 104, 106, 108 configure a differential amplifier circuit. Specifically, the operational amplifier 105 and the resistors 103, 104, 106, 108 amplify a difference between the voltage Va from the operational amplifier 102 and the voltage V6 from the operational amplifier 107, to thereby output a resultant voltage. Note that the operational amplifier 107 is a unity gain buffer that outputs the voltage V6.

====Operational Amplifier 109 and Resistor 110====

The operational amplifier 109 is a unity gain buffer that outputs the voltage received from the differential amplifier circuit, and outputs the voltage Vca through the resistor 110.

<<<Operation of Control IC 40b>>>

Figure 10:
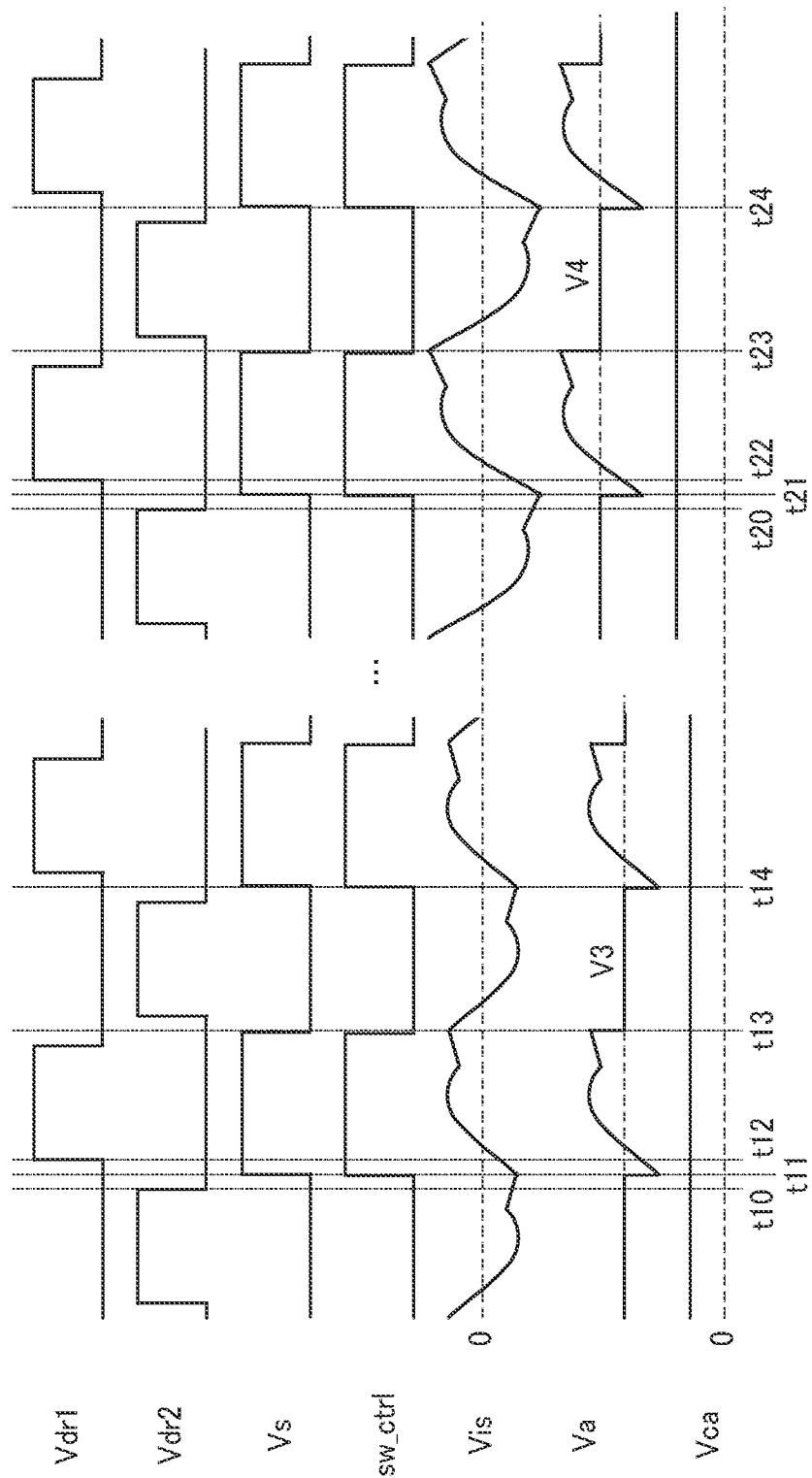
FIG. 10 is a chart illustrating an example of the operation of a control IC 40b.

FIG. 10 is a chart illustrating an example of the operation of the control IC 40b. Note that changes in the driving signals Vdr1, Vdr2, the voltage Vs, and the signal sw_ctr1 at time t10 to 14 and changes therein at time t20 to t24 are the same as changes in these signals and voltages at time t0 to t4 in FIG. 7, respectively. Thus, in the operations from time t10 to t14 and from time t20 to t24, only portions thereof different from the operations from time t0 to t4 in FIG. 7 will be described below.

Further, the operations from time t10 to t14 are performed when the selection circuit 76 selects the voltage V1 and the voltage V3, in other words, when the load 11 is under light load condition. Meanwhile, the operations from time t20 to t24 are performed when the selection circuit 76 selects the voltage V2 and the voltage V4, in other words, when the load 11 is under heavy load condition.

At time t11, the switch 90 in FIG. 9 is turned on in response to the high signal sw_ctr1, and the voltage Va at the node A results in the voltage V5 (i.e., the voltage V1).

At time t13, the switch 92 in FIG. 4 is turned on in response to the low signal sw_ctr1, and the voltage Va at the node A results in the voltage V6 (i.e., the voltage V3). Then, the same operation is repeated from time t14.

In the case of time t10 to t14, the voltage Va at the node A in the charge-discharge circuit 82b is generated from the voltage V1 and the voltage V3. Further, the voltages V1, V3 are obtained by multiplying the voltage Vis and voltage Vdd by a factor of A1, respectively, and thus the voltage generator circuit 72b can output the voltage Vca that better reflects a small variation in the voltage Vis.

At time t21, the switch 90 in FIG. 9 is turned on in response to the high signal sw_ctr1, and the voltage Va at the node A results in the voltage V5 (i.e., the voltage V2).

At time t23, the switch 92 in FIG. 4 is turned on in response to the low signal sw_ctr1, and the voltage Va at the node A results in the voltage V6 (i.e., the voltage V4). Then, the same operation is repeated from time t24.

In the case of time t20 to t24, the voltage Va at the node A in the charge-discharge circuit 82b is generated from the voltage V2 and the voltage V4. Further, the voltages V2, V4 are obtained by multiplying the voltage Vis and voltage Vdd by a factor of A2, respectively, and thus the voltage generator circuit 72b can output the voltage Vca that better reflects the condition of the load 11 when variation in the voltage Vis is large.

As such, the voltage generator circuit 72b outputs the voltage Vca, based on the voltages V1 to V4. The voltages V1, V3 are obtained by multiplying the voltage Vis and voltage Vdd by a factor of A1, respectively, and the voltages V2, V4 are obtained by multiplying the voltage Vis and voltage Vdd by a factor of A2, respectively. Accordingly, by selectively using the voltages multiplied by a factor of A1 or A2, the voltage generator circuit 72b can output the voltage Vca that is more precise, from when the load 11 is under light load condition to when the load 11 is under heavy load condition.

Further, the voltage generator circuit 72b outputs the voltage Vca using the voltage V2 obtained by multiplying the voltage Vis by a factor of A2 smaller than A1, when the load 11 is under heavy load condition, the resonant current Icr is large, and variation in the voltage Vis is large. Further, with the use of the voltage V2 obtained by multiplying the voltage Vis by a factor of A2, the voltage generator circuit 72b can output the voltage Vca without saturating it, even when the variation in the voltage Vis is large.

===Summary===

The switching power supply circuit 10 according to an embodiment of the present disclosure has been described above. The control IC 40a includes the IS terminal, the resistors 61, 62, the resistors 64, 65, and the driver circuit 74. The resistors 61, 62 output the voltage V1 obtained by multiplying the voltage Vis by "a factor of A1". Thus, the control IC 40a can output the voltage Vca that precisely reflecting variation in the voltage Vis, even if the load 11 becomes under light load condition and the resonant current Icr is small. This makes it possible to provide an integrated circuit capable of accurately detecting a resonant current, even if a load is under light load condition.

Further, the resistors 61, 62 and the resistors 64, 65 configure voltage divider resistor circuits, respectively. Thus, with the voltage division ratios of these two voltage divider resistor circuits being set different from each other, two different factors can be implemented.

Further, the control IC 40a includes a diode provided between the coupling point of the resistors 61 and 62 and the ground. Thus, even if the difference ΔVis is divided by the resistors 61, 62, the voltage V1 can be prevented from dropping to a large negative voltage. This can minimize malfunctions of the internal circuit of the control IC 40a.

Further, the control IC 40a includes the terminal CA, the resistors 66, 67, and the voltage generator circuit 72a. The resistors 66, 67 have the same voltage division ratio as that of the resistors 61, 62. This makes it possible that the voltage generator circuit 72a generates the voltage Vca indicating the condition of the load 11 more precisely.

Further, the control IC 40a further includes the overcurrent protection circuit 71. In addition, the overcurrent protection circuit 71 detects an overcurrent based on the voltage V2 outputted by the resistors 64, 65. Accordingly, when the resonant current Icr is large, an overcurrent is detected in the voltage V2 which is obtained by voltage dividing by a voltage division ratio corresponding to "a factor of A2". This makes it possible to use two voltage divider resistor circuits for applications different depending on whether the resonant current Icr is small or large.

Further, the control IC 40a further includes the load detection circuit 73. This makes it possible to detect the condition of the load 11, based on the accurate voltage Vca, even when the resonant current Icr is small.

Further, the control IC 40b further includes the resistors 68, 69, the comparator 75, and the selection circuit 76. This makes it possible for the control IC 40b to output the voltage Vca, based on a voltage outputted from one of voltage divider resistor circuits having voltage division ratios corresponding to different factors, according to the level of the voltage Vca. Further, with the use of the voltage V2 obtained by multiplying the voltage Vis by a factor of A2, the voltage generator circuit 72b can output the voltage Vca without saturating it, even when variation in the voltage Vis is large.

The present disclosure is directed to provision of an integrated circuit capable of accurately detecting a resonant current, even if a load is under light load condition.

According to the present disclosure, it is possible to provide an integrated circuit capable of accurately detecting a resonant current, even if a load is under light load condition.

Embodiment(s) and modifications of the present disclosure described above is/are simply to facilitate understanding of the present disclosure and is/are not in any way to be construed as limiting the present disclosure. The present disclosure may variously be changed or altered without departing from its essential features and encompass equivalents thereof.

What is claimed is:

1. An integrated circuit for a power supply circuit of a resonant type, the power supply circuit including
a resonant circuit including a coil and a capacitor coupled in series, and
a switching device configured to control a resonant current flowing through the resonant circuit,
the integrated circuit being configured to drive the switching device, the integrated circuit comprising:
a first terminal configured to receive a voltage corresponding to the resonant current;
a first voltage output circuit configured to output a first voltage obtained by multiplying the voltage at the first terminal by a first factor;
a second voltage output circuit configured to output a second voltage obtained by multiplying the voltage at the first terminal by a second factor smaller than the first factor; and
a driver circuit configured to drive the switching device based on the first voltage, the second voltage, and a feedback voltage corresponding to an output voltage of the power supply circuit, wherein
both the first voltage output circuit and the second voltage output circuit are coupled between a power source and the first terminal.

2. The integrated circuit according to claim 1, wherein
the first voltage output circuit is a first voltage divider resistor circuit configured to divide a first difference between a predetermined voltage and the voltage at the first terminal by a first voltage division ratio corresponding to the first factor, to thereby output a resultant voltage thereof as the first voltage, and
the second voltage output circuit is a second voltage divider resistor circuit configured to divide the first difference by a second voltage division ratio corresponding to the second factor, to thereby output a resultant voltage thereof as the second voltage.

3. The integrated circuit according to claim 2, further comprising a diode having a cathode coupled to an output of the first voltage divider resistor circuit, and an anode that is grounded.

4. An integrated circuit for a power supply circuit of a resonant type, the power supply circuit including
a resonant circuit including a coil and a capacitor coupled in series, and
a switching device configured to control a resonant current flowing through the resonant circuit,
the integrated circuit being configured to drive the switching device, the integrated circuit comprising:
a first terminal configured to receive a voltage corresponding to the resonant current;
a first voltage output circuit configured to output a first voltage obtained by multiplying the voltage at the first terminal by a first factor, the first voltage output circuit being a first voltage divider resistor circuit configured to divide a first difference between a predetermined voltage and the voltage at the first terminal by a first voltage division ratio corresponding to the first factor, to thereby output a resultant voltage thereof as the first voltage;
a second voltage output circuit configured to output a second voltage obtained by multiplying the voltage at the first terminal by a second factor smaller than the first factor, the second voltage output circuit being a second voltage divider resistor circuit configured to divide the first difference by a second voltage division ratio corresponding to the second factor, to thereby output a resultant voltage thereof as the second voltage;
a driver circuit configured to drive the switching device based on the first voltage, the second voltage, and a feedback voltage corresponding to an output voltage of the power supply circuit;
a diode having a cathode coupled to an output of the first voltage divider resistor circuit, and an anode that is grounded;
a second terminal;
a third voltage divider resistor circuit configured to divide a second difference between the predetermined voltage and a ground voltage by a third voltage division ratio corresponding to the first factor, to thereby output a resultant voltage thereof as a third voltage; and
a voltage generator circuit configured to generate, at the second terminal, a voltage indicating a condition of a load of the power supply circuit, based on the first and third voltages.

5. The integrated circuit according to claim 4, further comprising:
a first detection circuit configured to detect whether the resonant current is an overcurrent, based on the second voltage, wherein
the driver circuit turns off the switching device, responsive to the resonant current becoming the overcurrent.

6. The integrated circuit according to claim 5, further comprising:
a second detection circuit configured to detect the condition of the load, based on the voltage at the second terminal, wherein
the driver circuit intermittently switches the switching device, responsive to the load becoming under a light load condition.

7. The integrated circuit according to claim 4, further comprising:
a fourth voltage divider resistor circuit configured to divide the second difference by a fourth voltage division ratio corresponding to the second factor, to thereby output a resultant voltage thereof as a fourth voltage;
a determination circuit configured to determine whether the voltage at the second terminal is higher than a reference voltage;
a selection circuit configured to
select the second voltage and the fourth voltage, responsive to the voltage at the second terminal being higher than the reference voltage, and
select the first voltage and the third voltage, responsive to the voltage at the second terminal being lower than the reference voltage, wherein
the voltage generator circuit generates, at the second terminal, the voltage indicating the condition of the load, based on the selected voltages.

8. A power supply circuit of a resonant type, the power supply circuit comprising:
a resonant circuit including a coil and a capacitor coupled in series;
a switching device configured to control a resonant current flowing through the resonant circuit; and
an integrated circuit configured to switch the switching device, the integrated circuit including
a first terminal configured to receive a voltage corresponding to the resonant current,
a first voltage output circuit configured to output a first voltage obtained by multiplying the voltage at the first terminal by a first factor, a second voltage output circuit configured to output a second voltage obtained by multiplying the voltage at the first terminal by a second factor smaller than the first factor, and a driver circuit configured to drive the switching device, based on the first voltage, the second voltage, and a feedback voltage corresponding to an output voltage of the power supply circuit, wherein both the first voltage output circuit and the second voltage output circuit are coupled between a power source and the first terminal.

* * * * *